United States Patent

[11] 3,573,676

[72] Inventor Ferdy Mayer
8 Boulevard Gambetta, Grenoble, Isere, France
[21] Appl. No. 509,878
[22] Filed Nov. 26, 1965
[45] Patented Apr. 6, 1971
[32] Priority Nov. 26, 1964
[33] France
[31] 996391

[54] ELEMENTS FOR THE TRANSMISSION OF ELECTRICAL ENERGY
20 Claims, 26 Drawing Figs.

[52] U.S. Cl. .................................................. 333/79,
178/45, 333/84, 333/81, 333/96
[51] Int. Cl. ..................................................... H03h 7/02
[50] Field of Search ........................................... 333/70, 79,
96; 174/36; 178/45; 123/148

[56] References Cited
UNITED STATES PATENTS

| | | | |
|---|---|---|---|
| 2,769,150 | 10/1956 | Black .......................... | 333/96 |
| 2,831,921 | 4/1958 | Morgan ....................... | 178/45 |
| 2,777,896 | 1/1957 | Black .......................... | 178/45 |
| 2,238,915 | 4/1941 | Peters.......................... | 333/79 |
| 3,125,733 | 3/1964 | Holinbeck.................... | 333/79 |
| 3,191,132 | 6/1965 | Mayer.......................... | 333/79 |
| 2,228,798 | 1/1941 | Wasserman .................. | 178/45 |
| 3,163,836 | 12/1964 | Sugi............................. | 333/96 |
| 2,769,148 | 10/1956 | Clogston ...................... | 333/96 |
| 2,769,149 | 10/1956 | Kreer ........................... | 333/96 |
| 2,929,034 | 3/1960 | Doherty ....................... | 333/96 |
| 2,796,463 | 6/1957 | Mallinckrodt................ | 333/96 |

Primary Examiner—Herman Karl Saalbach
Assistant Examiner—C. Baraff
Attorney—Spencer and Kaye ABSTRACT: A device for transmitting electrical energy and including at least one conductive element whose structure is heterogeneous in the radial direction in that the element is composed of a plurality of concentric layers which are so selected that the value of at least one electrical or magnetic parameter of these layers varies progressively from one layer to the next, and hence in the direction of the radius of the element, the thickness of each layer being at least equal to the conventional skin effect thickness of that layer at a frequency which is at least equal to the cutoff frequency of the element.

Patented April 6, 1971

Inventor:
Ferdy Mayer
By: Spencer & Slaye
Attorneys

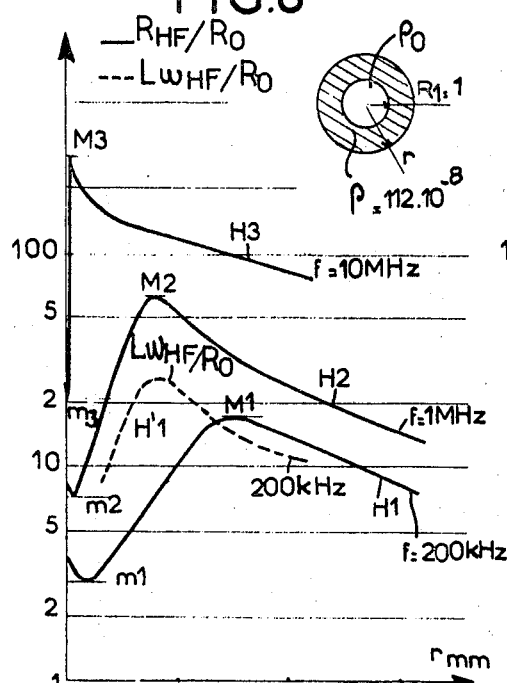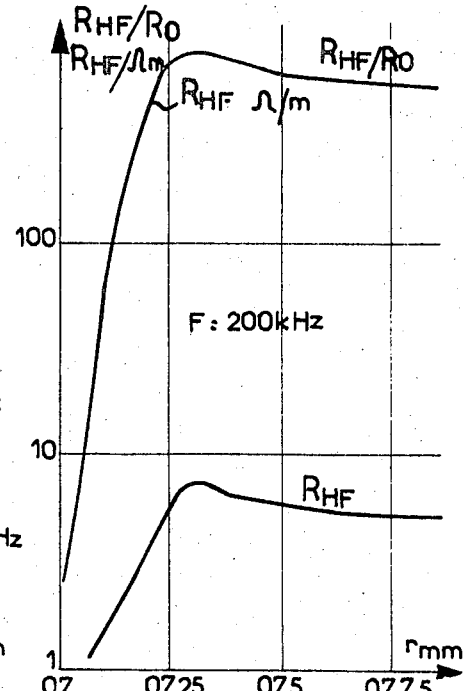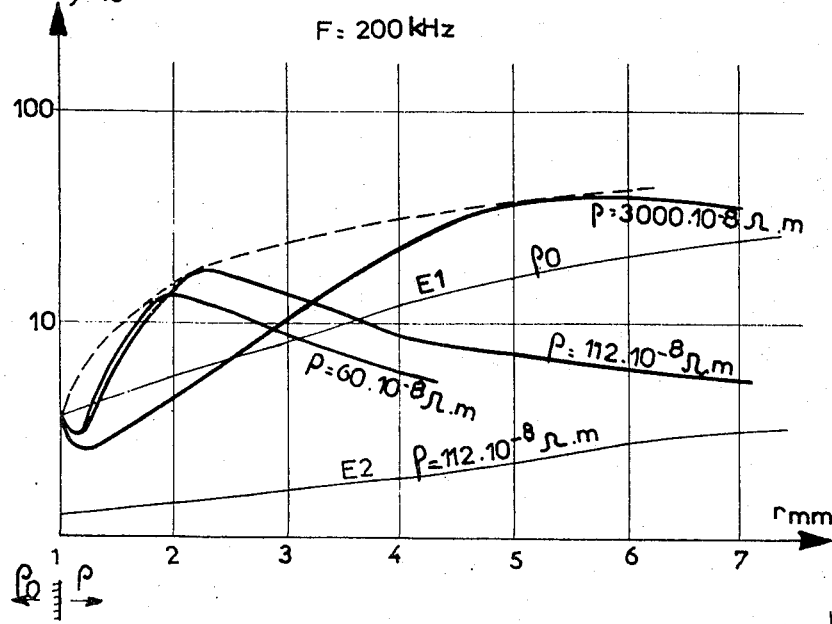

FIG.11
FIG.12
FIG.13
FIG.14
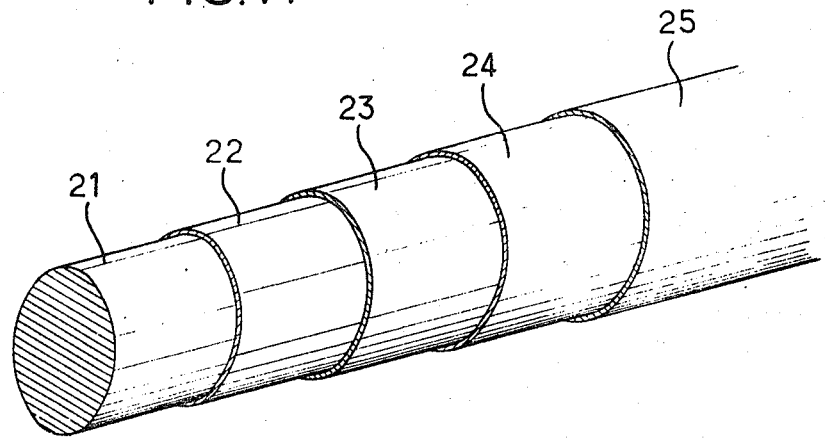
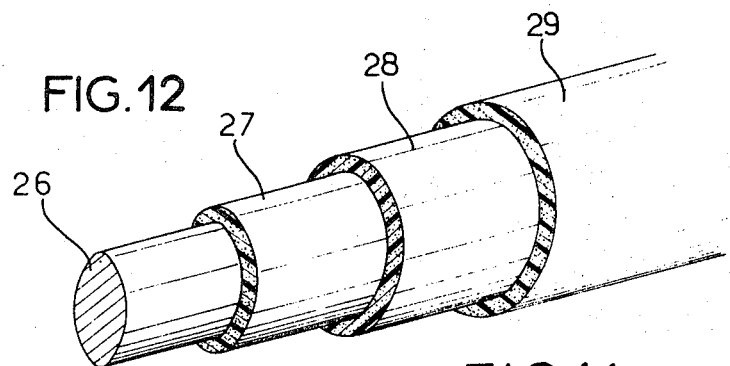
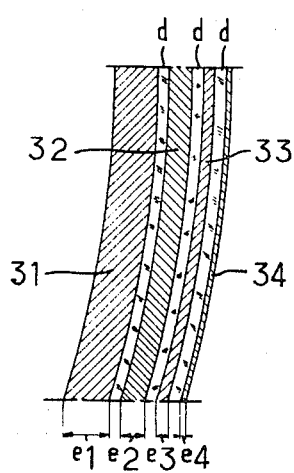
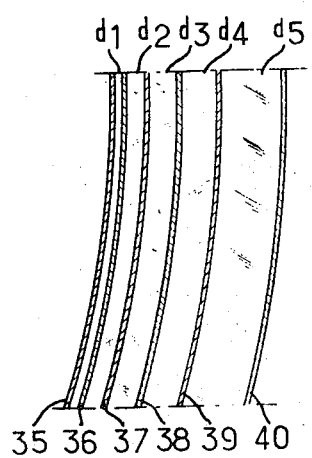

Inventor:
Ferdy Mayer
By: Spencer & Kaye
Attorneys

Patented April 6, 1971
3,573,676
6 Sheets-Sheet 6
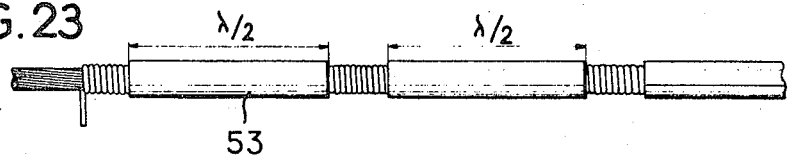
FIG. 22
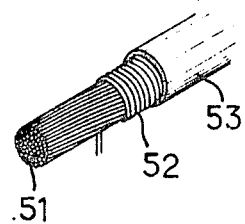
FIG. 21
FIG. 23
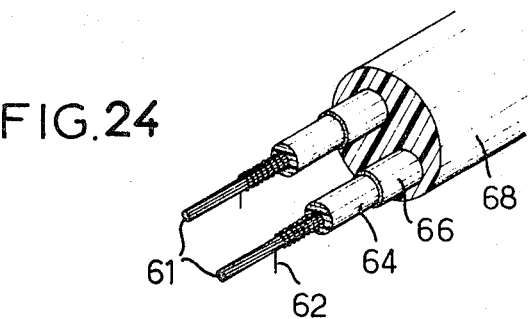
FIG. 24
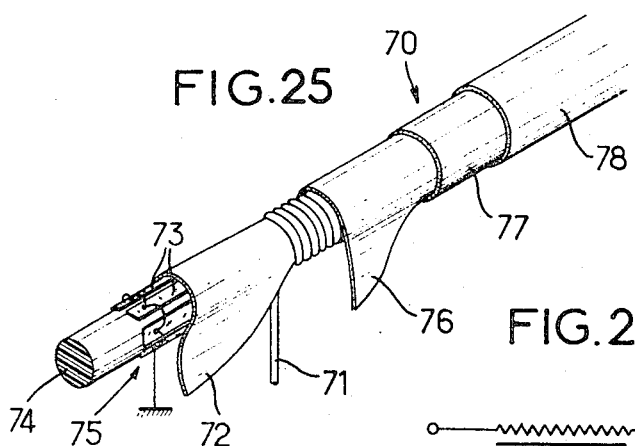
FIG. 25
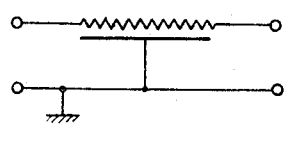
FIG. 26
Inventor:
Ferdy Mayer
By: Spencer & Kaye
Attorneys

ELEMENTS FOR THE TRANSMISSION OF ELECTRICAL ENERGY

The present invention relates to elements for the transmission of electrical energy, and more especially to selective absorption elements of the kind which selectively provide an absorption and an impedance determined within a chosen range of high frequencies.

This designation may equally well encompass transmission cables devised to transmit a certain range of frequencies, such as cables designed to attenuate certain frequencies specifically so-called anti-interference cables and certain types of filters.

The invention relates more specifically to the category of elements of this nature which, around a conductive element, comprise at least one tubular dissipative element intended to intervene selectively within a predetermined range of more or less high frequencies. The basis of these dissipative elements is often semiconductor materials obtained for example by suspension of a charge of carbon or the like within an insulating environment.

Selective absorbent elements are also known, specifically anti-interference cables of the kind described in my U.S. Pat. No. 3,191,132 in which dissipation is obtained by employing cores or sheaths incurring losses by magnetic or dielectric resonance.

In principle there are thus eliminated the innumerable combinations of reactances engendering conventional filtering effects, in view of the uncertainties of the resonance phenomena and of the risks of enhanced radiation of the energy at certain frequencies resulting therefrom.

The attenuation which could be obtained hitherto by employing purely dissipative elements, that is to say in the transmission elements in which the reactance effects do not play a predominant part, are relatively modest as a rule.

The invention is based on the observation of the well-known fact of energy exchange between structures at different speeds of propagation. It is known that the metallic surface of a conductor traversed by a high frequency current tends to radiate the energy into the surrounding atmosphere and thus prevents the localization of fields and a substantial local attenuation. This substantial local attenuation being precisely one of the targets sought.

It is a main object of the present invention to improve the performance of transmission elements which transmit a certain range of frequencies.

A further object of the invention is to provide improved conditions of energy exchange between a conductive element and a dissipative element surrounding the conductive element, thereby improving considerably the performance of anti-interference cables.

Another object of the invention is to make possible, or enhance, the attenuation of electrical energy in at least one dissipative layer in an electrical conductor.

Yet another object of the invention is to localize at least a part of the field which has a tendency to escape from the superficial layer of a conductor, by applying to the surface of the conductor means adapted to effect said localization.

Still further it is an object of the invention to provide suppression of interference radiated from an electric cable, by selective absorption of energy within a predetermined range of high frequencies.

Another object of the invention is to provide an electrical energy transmission element in which there is equidistribution of current density, or substantially so, radially of the transmission element in certain frequency ranges.

According to the invention an element for the transmission of electrical energy, of the kind comprising at least one conductive element of heterogeneous structure in the radial direction, is characterized by a distribution in the radial direction of at least one of the parameters resistivity, permeability and permittivity of the materials forming the said conductive element, selected in such manner as to impose on the resistance of the conductor a predetermined variation within a given range of frequencies by a modification of the radial distribution of the current density as compared with the distribution of the conventional skin effect in a sense tending to reduce the current density at the surface to the advantage of the current passing inside the conductor.

There is thus achieved the successive arrangement from the inside towards the outside, of a region of decelerated propagation of the current wave, and of a dissipative region of accelerated propagation of the said wave.

As will be seen from different examples to be described hereinafter, this application of the energy exchange phenomenon in the direction slow wave-faster wave, makes it possible to obtain surprising performances with extremely simple devices.

The exploitation of the phenomena of energy exchange leads to the formation of conductors heterogeneous in the radial sense, and to the discovery of the fact that an effect of maximum absorption corresponds, in the case of layers with radial variation of their parameters, to an equidistribution of the current density, and in the case of a layer having constant parameters, to an optimum thickness of the order of the skin thickness corresponding to these parameters.

According to another of its features, the invention thus leads to the discovery of possibilities of absorptions lower than those of a homogeneous conductor in a limited frequency range.

Among the numerous possible applications of the selectively accrued absorptions according to the invention, it is appropriate to emphasize specially the branch of industrial cables and overhead power transmission lines which at present form one of the most troublesome sources of industrial radio interference.

The possibility of selective reduction of the absorption makes possible applications in the field of power transmission lines or of communications at high frequencies.

Despite the great diversity of combinations already suggested, and the multitude of practically valid embodiments which is also great but more easily enumerable, the invention, for the first time, offers the possibility of an application of the energy exchange phenomena referred to above, in the field in question. An indication in this sense is given by the surprising fact that the effectiveness of the dissipative regions or layers according to the invention is not reduced substantially if these layers do not completely surround the conductor of the subjacent layer: such is the case for example, of layers embodied in helical form with nonabutting turns.

In order that the invention may be more clearly understood some embodiments thereof will now be described, by way of example, with reference to the accompanying drawings, in which:

FIG. 8 shows, as a function of the overall radius, for different frequencies, the variations in the resistance of a copper conductor having a radius of 1 millimeter coated with a homogeneous resistive dissipative layer;

FIG. 9 shows, in the same way but for the constant frequency of 200 kc/s, the variations of the ratio $R_{HF}/R_0$ as a function of the radius for different values of the resistivity;

FIG. 10 shows the effect of a magnetic dissipative layer of varying thickness on a copper wire of a radius of 0.7 mm.;

FIG. 11 shows an example of a metallic structure having a magnetic dissipative layer;

FIG. 12 illustrates a conductor having a stratified nonmetallic covering;

FIGS. 13 and 14 show two different kinds of stratified dissipative structures, comprising a series of dissipative layers separated by insulating layers;

FIGS. 15, 17, 19 and 21 illustrate different embodiments of cables according to the invention;

FIGS. 16, 18, 20 and 22 are graphs corresponding to the four preceding FIGS. respectively;

FIG. 23 illustrates a modified form of a cable according to FIG. 21;

FIG. 24 illustrates an industrial cable according to the invention;

FIG. 25 illustrates a section of a cable according to the invention, adapted to form a filter; and FIG. 26 is an equivalent circuit diagram corresponding to the filter cable of FIG. 25.

In order to disclose the essential features of the present invention, simplified analysis of the behavior of high frequency electrical conductors will now be given.

One of the best known aspects of this behavior is the skin effect according to which the electric current tends to become localized on the surface of the conductor, and the skin thickness is the term applied to the depth at which, starting from the surface of the conductor, the current density is reduced in the ratio $1/e$, say to approximately 30 percent of the surface value. This skin effect goes in step with a reduction in the phase propagation speed.

It is known on the other hand, that slow propagation structures exchange energy with the surrounding, faster propagation environment, in the direction slow wave towards the faster wave. These conditions exist in the air around metal conductors and the result is that these conductors radiate energy easily. If a conductor is covered with a layer in which the wave is propagated a little more quickly, a good portion of the field which has the tendency to escape is localized in this layer. It is possible however, if this layer is dissipative, to obtain an attenuation of the said wave by the losses caused in the said layer. Thus, by incorporating successive layers which are both dissipative and offer a progressive rise in the speed of propagation due to a variation in resistivity, considerable absorption is achieved and radiation is practically nonexistent. The high frequency electrical energy carried by the internal conductor is then absorbed to a substantial extent by the external dissipative layers.

The outermost layers may have very low conductivities and may correspond to quasi-insulators, that is to say to insulators of poor quality. It is then of interest to consider, instead of the conductivity $c$, the equivalent term $\epsilon''\omega$, in which term $\epsilon''$ is the imaginary part of the complex permittivity $$\epsilon = \epsilon' - j\epsilon'' = \epsilon'(1 - tg\delta)$$

($\delta\epsilon$ = angle of electrical losses)

This notation has the advantage of introducing all other dielectric losses, as well as losses by conduction.

According to the invention one is thus led to embody around a conductive element, successively in the radial direction from the inside towards the outside, a region of decelerated propagation to obtain as slow as possible a wave at the beginning, then a dissipative region with gradual increase of the speed of propagation by increase of resistivity. For a given external size of the heterogeneous conductor thus formed, the absorption effect is greater, the more the speed is reduced at the center. On the other hand, maximum absorption is expected close to the frequency at which the thickness of the layer will be of the order of the thickness of the skin, for each of the dissipative layers in question.

Figure 1:
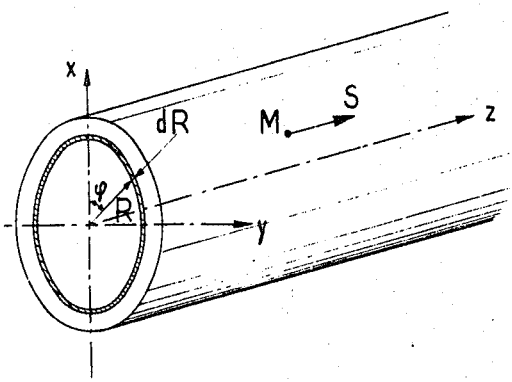
FIG. 1 is a schematic view of a cylindrical conductor according to the invention.

One thus envisages wholly metallic structures, and more specifically a cylindrical structure (FIG. 1) embodying variation of the resistivity of the metal from the center towards the periphery.

In a preliminary theoretical investigation, a cylindrical conductor has thus been considered, in which the resistivity $\rho$ is a function of the radius $R$ and independent of the orientation $\Phi$ as well as of the coordinate $z$. Starting from the Maxwell equations, it proved possible to establish that the current density, $S = X + jY$, is governed by the following variable coefficient second order differential equation system:

$$(E) \quad \rho S'' + \left(2\rho' + \frac{\rho}{R}\right) S' + \left(\rho'' + \frac{\rho'}{R} - j\omega\mu\right) S = 0$$

A first series of calculations could be performed on a computer in the case of a cylindrical conductor having a parabolic variation of resistivity:

$$\rho = \rho_0(1 + kR^2)$$

and this more specifically in the case of a cylindrical conductor having a radius of 1 mm., and as the parameter: resistivity at the center $\rho_o = 1.7\mu\Omega$. cm (resistivity of copper), and a coefficient $k = 6500$, resulting in a resistivity equal to that of "nichrome," for $r = 1$ mm.

Figure 2:
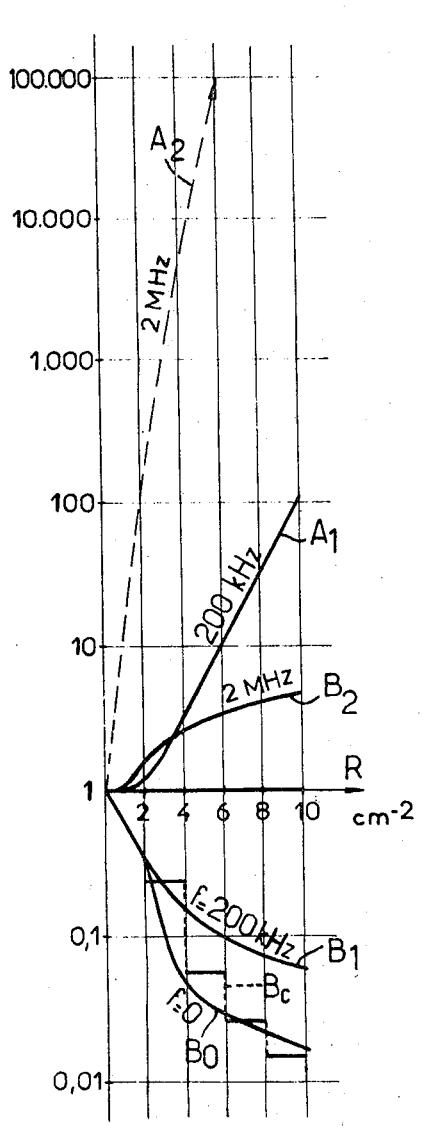
FIG. 2 is a diagram showing curves of variations in current density as a function of the radius in a conductor according to FIG. 1.

Some of the data thus collected is employed in the diagram of FIG. 2, in which the radius $R$ is plotted as the abscissa, whereas the current density values are plotted as ordinates on a logarithmic scale. The curve $A_1$ shows the current density variation as a function of the current in a homogeneous copper conductor at the frequency of 200 kc/s.

The curve $A_2$ corresponds to a frequency of 2 Mc/s.

The curve $B_o$ indicates the direct current variations in current density in a heterogeneous conductor having parabolic resistivity variation as defined hereinabove. Thus this curve at the same time illustrates the variations of conductivity as a function of the radius. In the heterogeneous conductor thus formed, the current density at the frequency of 200 kc/s varies according to the curve $B_1$; the variation at 2 Mc/s is shown at $B_2$.

It is apparent therefore that in a conductor thus formed, up to a certain frequency lying between 200 kc/s and 2 Mc/s, the current density remains lower in the peripheral regions than the current density at the center. The heterogeneous structure of the conductor is opposed to the development of the skin effect, and thus assures a localization of fields within the conductor, that is to say in the dissipative regions of the internal structure of the conductor.

It is possible, and this can be verified, that there is a frequency (lying between 200 kc/s and 2 Mc/s in the case in question) at which an equidistribution of current density as a function of the radius is achieved.

Figure 4:
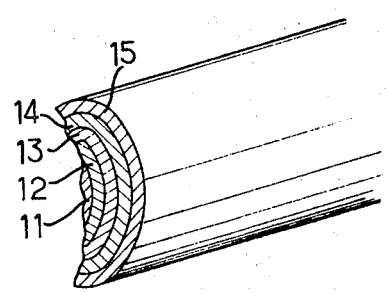
FIG. 4 shows an example of a conductor according to the invention having a heterogeneous metallic structure.

FIG. 4 illustrates a multilaminar conductor comprising a copper wire 11 and a succession of coaxial tubular layers 12 to 15, made up as follows:

| Material | Resistivity, $\mu\Omega$ cm. |
|---|---|
| Layer: | |
| 12_ _ Brass (Cu + Zn) | 7 |
| 13_ _ Nickel silver (60% Cu, 10% Ni, Zn) | 30 |
| 14_ _ Manganese steel (13% Mn, 1% C, 18% Cr, 68% Fe) | 64 |
| 15_ _ Nichrome (61% Ni, 15% Cr, Fe) | 112 |

The variations in the conductivity of this conductor as a function of its radius are illustrated by the stepped curve $B_c$ of FIG. 2, which may be considered as an approximate realization of the theoretical curve $B_o$.

An experimental arrangement of this nature is interesting in that it allows verification of the calculations relating to variations, as a function of frequency, of the current distribution, of the impedance, and of the attenuation in the case of a purely metallic structure. The possibility is noted in particular of opposing a localization of the current at the surface of the conductor, that is to say the skin effect.

Figure 3:
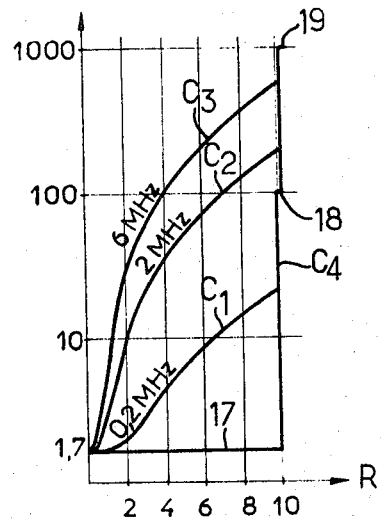
FIG. 3 is a diagram showing theoretical curves of variations in resistivity as a function of the radius of the conductor.

FIG. 3 shows at $C_1$, $C_2$ and $C_3$ resistivity variations calculated as a function of the radius for obtaining a uniform distribution of the current density at 0.2, 2 and 6 Mc/s, respectively. $C_4$ shows a graph having three steps 17, 18, 19 corresponding to a practical embodiment of the kind which will be reverted to later on, namely a copper conductor step 17 covered by two thin layers represented by the steps 18 and 19 respectively, and consequently formed by materials which are approximately 100 and 1,000 times more resistive than copper.

It has been verified that optimum attenuation corresponds to an equidistribution of current as a rule. An ultimate maximum is thus obtained with a special resistivity variation law (cf. FIG. 3) and a maximum will be obtained in the case of a variation law given a priori for a certain frequency.

Figure 5:
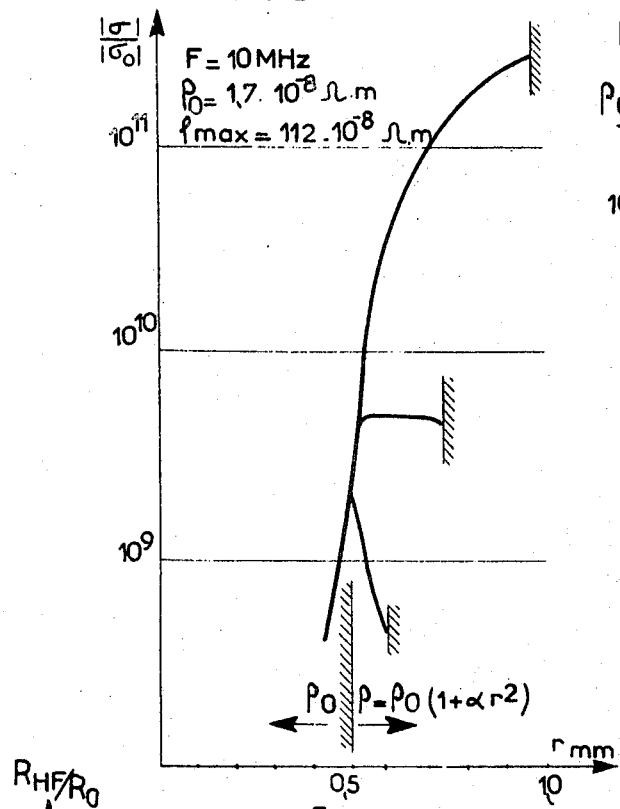
FIG. 5 is a diagram of the current densities in a dissipative layer with parabolic variation of the resistivity for different values of the thickness of the layer ($\sigma o$ = density at the center of the conductor)
Figure 6:
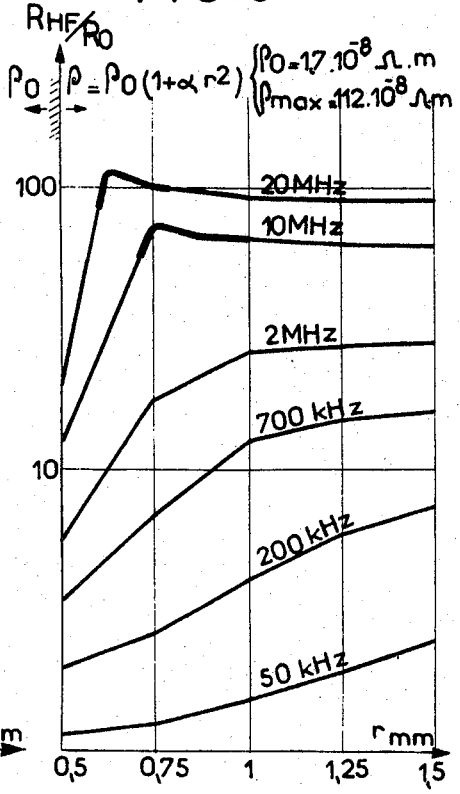
FIG. 6 shows, for different frequencies, the variations in the resistance $R_{HF}$ of a copper conductor coated with a dissipative layer with parabolic variation of the resistivity, as a function of the thickness of the layer.

FIGS. 5 and 6 represent the case in which, on a core of copper of 0.5 mm. radius, is placed a layer whose resistivity is variable according to a parabolic law and with the limits specified above for different values of the overall thickness of the layer.

FIG. 5 shows, for a constant frequency of 10 Mc/s, the radial variation of the current density for different values of the thickness of the layer, starting from the same density at the surface of the copper core.

It will be noted:
1. that this density remains independent of the thickness of the layer;
2. that for a certain value of the overall thickness of the layer, say 0.25 mm. approximately, the distribution of the current density comes as close as possible to a uniform distribution.

FIG. 6 shows that this corresponds to a maximum of the ratio $R_{HF}/R_o$ between the resistance at the frequency in question, and the direct current resistance, which corresponds to maximum absorption.

Figure 7:
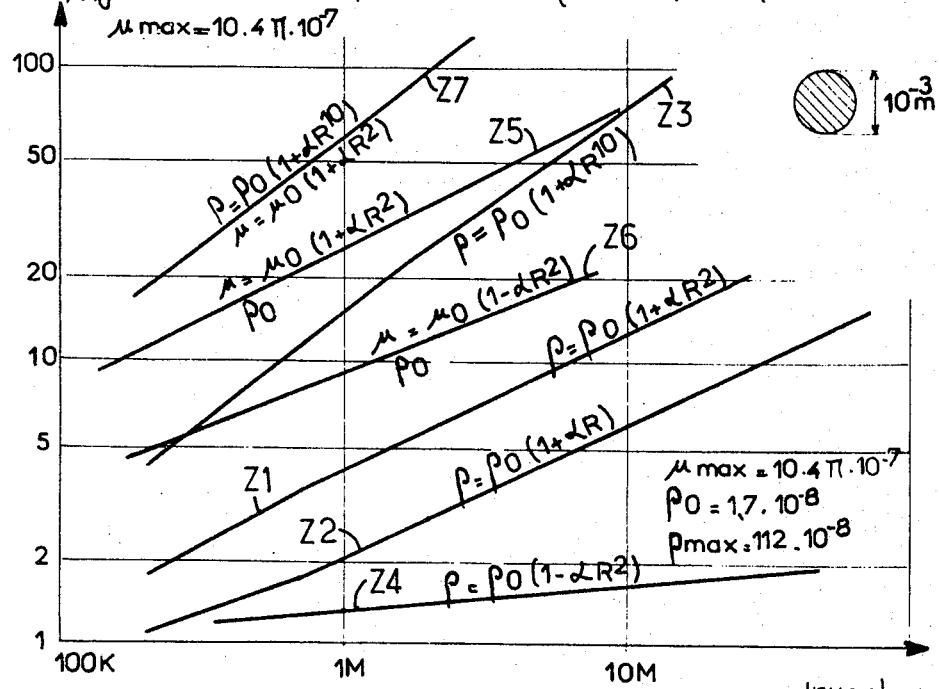
FIG. 7 shows, as a function of the frequency, the variations of the resistance $R_{HF}$ of a conductor having a diameter of 1 mm. for progressive variation of its parameters $\rho$ and $\mu$ according to different laws.

A parabolic law variation has been investigated practically, in the preceding description. In FIG. 7, the curve Z1 reproduces the variation of the ratio $R_{HF}/R_o$ as a function of the frequency for such a parabolic variation law of the resistivity from the center to the periphery of a conductor. The variations of this same ratio have also been examined for other laws of the kind $\rho=\rho_o(1+\alpha R^n)$ with the same values of $\rho_o$ and of $\rho$ max.

The curve Z2 shows the variations obtained with a linear law ($n=1$).

The curve Z3 corresponds to $n=10$.

It is noted that the absorption rises with $n$, with a maximum for $n$ of the order of 10. This corresponds to maximum absorption for a law of this type.

The curve Z4, which corresponds to an inverse variation in the resistivity as a function of the radius (by placing $\rho$ max. at the center), shows that a very small variation of $R_{HF}/R_o$ as a function of frequency is obtained. This shows the way of obtaining a conductor having a resistance independent of the frequency, thus exempt from the skin effect.

Only the variations of resistivity have been considered in the preceding description. The effect of variations of the permeability $\mu$ of the material as a function of the radius $R$ will now be considered.

First of all, the curves Z5 and Z6 show what occurs if the permeability alone varies as a function of the radius, the resistivity remaining constant. Z5 corresponds to an increasing parabolic variation and Z6 to a decreasing parabolic variation of the permeability. It is apparent:
1. that one may obtain considerable attenuations;
2. that it is the rise in permeability towards the outside which gives the greatest absorption.

Finally, the curve Z7 corresponds to a concomitant increase towards the outside of the resistivity and of the permeability, giving the possibility of reaching very great attenuations, which will be confirmed hereinafter.

The continuous variations which have been considered of the parameters $\rho$ and $\mu$ represent theoretical cases, at least in the present state of technology. FIGS. 11 and 12 show two first examples of heterogeneous stratified structures which make it possible to embody practical approximations of the laws of continuous variations, with stepped variations of the parameters.

FIG. 11 shows a heterogeneous conductor comprising a straight conductor 21 of copper ($\mu=1$, $\rho=1$) and a series of thin layers 22 to 25 respectively consisting of brass ($\mu=1$, $\rho=10\mu=1$, $\rho=100$), of iron ($\mu=1,000$, $\rho=10$) and of nickel iron ($\mu=10,000$, $\rho=100$). (These resistivity data are given in relative approximate values with respect to copper). This again represents a purely metallic embodiment of the invention in which, by considering simultaneously the permeability and the conductivity, a variation of the parameters has been accomplished for the purpose of maximum absorption according to the rules which have been specified.

In a second kind of embodiment shown in FIG. 12, a series of layers 27, 28, 29 of absorbent plastic mixtures is applied on a straight copper conductor 26. The different layers have the following compositions (PVC = polyvinyl chloride; C = carbon; the ferrite is based on manganese and zinc):

Layer 27: PVC 35 percent—ferrite 35 percent—C 30 percent

Layer 28: PVC 30 percent—ferrite 50 percent—C 20 percent

Layer 29: PVC 20 percent—ferrite 70 percent—C 10 percent.

These layers thus establish a stepped increase of both the permeability and of the resistivity. Each of the layers is made dissipative, by conduction due to the carbon charge, as well as due to magnetic resonance according to the technique known at present for the production of absorbent mixtures.

For closer study of the influence of such stepped variations of the parameters, a detailed examination was made of the simplest case of a single layer with constant parameters. FIGS. 8 and 9 correspond to the application, on a copper conductor having radius $R1$, of a single resistive layer extending to a radius $R2$. The three curves H1, H2, H3 of FIG. 8 show the variations of the ratio $R_{HF}/R_o$ as a function of the thickness of the resistive layer for three frequencies of 200 kc/s, 1 Mc/s and 10 Mc/s respectively. The curve H'1 shows the corresponding variation of the ratio $L\omega/R_o$ for 200 kc/s. It may be noted that each of the curves H passes through a maximum M and that the three maxima M1, M2, M3 are situated close to the skin thickness which assumes the corresponding values of 1.2 mm. at 200 kc/s, of 0.54 mm. at 1 Mc/s and of 0.17 mm. at 10 Mc/s, for the resistive material in question ($\rho=112\times10^{18}$).

For the constant frequency of 200 kc/s, FIG. 9 shows several curves of variations of the ratio $R_{HF}/R_o$ as a function of the thickness of the layer for different values of the resistivity, and the correlation between the maxima of absorption and the different values of the skin thickness is again verified.

By way of reference, the curves E1, E2 correspond to homogeneous conductors of copper and of nichrome, respectively.

It is noted that the magnitude of the maximum of the ratio $R_{HF}/R_o$ (maximum of absorption) tends to rise with the resistivity of the added layer (FIG. 9) and that it increases with frequency (FIG. 8).

For such an isotropic layer on a conductive core, the distribution of the current density in the layer at a fixed frequency depends only:

on the diameter of the core,
on the ratio of the layer/core resistivities,
on the resistivity of the core.

At fixed frequency, for a given point inside the resistive layer, the current density is independent of the outer radius of the layer.

As shown by the curve H'1 (FIG. 8) the over voltage factor of the coated conductor ($L\omega/R_{HF}$) remains close to unity close to the maximum of $R_{HF}/R_o$ and may become smaller than unity for greater thicknesses. This fact that the techniques according to the invention do not add a reactance effect, but on the contrary diminish the reactance effect in comparison with the inductance of the bare basic conductor, is of special importance.

FIG. 8 reveals another fundamental phenomenon; being the passage of the curves H through minima $m1$, $m2$, $m3$, showing the possibility of obtaining a lower absorption than that of the homogeneous basic conductor. The fundamental importance of this discovery will not escape those versed in high frequency techniques, and specifically in long-distance telecommunications by wire.

It was already apparent in FIG. 7 (curve Z4) that decreasing variations of the resistivity from the center towards the periphery may lead to a design of conductors whose HF resistance does not vary with the frequency, that is to say in which the incidence of the skin effect has been suppressed. In this case, it is observed moreover that by applying on a basic conductor made of copper for example, a resistive layer of given thickness, the conductor will have lower losses, close to a certain frequency at which this thickness is a fraction of the thickness of skin of the resistive material, than with direct current and this identical direct resistance and even at identical external diameter.

At first sight, it may seem extremely surprising that a resistive or resistive and magnetic layer on the surface of a conductor made of copper or silvered copper for example, could lower its high frequency resistance $R_{HF}$; a physical explanation may however be derived by analysis of the influence of this layer on the distribution of the current density on the surface of the conductor. Roughly speaking, the resistive layer pushes the currents towards the interior of the conductor by an action opposed to the skin effect, which finally determine the HF losses. The possibility can be envisaged of reducing the HF losses of the copper or even of the silver conductor by 25 percent to 35 percent. This effect is very sensitive to frequency, but since the case is that of the absorbent effect, a band enlargement may be obtained by an optimum variation of the parameters in the layer which repel the current to the inside of the conductor.

FIG. 10 shows the results of a verification of the behavior of a single magnetic layer ($\rho$ and $\mu$ constant). The conductor in question is made of copper, has a diameter of 1.4 mms., is covered by a layer of varying thickness of magnetic NILOMAG 771 wire, having a resistivity of $57.10^{18}$ $\Omega$. m, and a permeability of 2,000 at the frequency of 200 kc/s. For a thickness of the order of 0.3 mm., a value of $R_{HF}/R_o$ of the order of 650 and a value of $R_{HF}$ of $7.2\Omega/m$ are reached at this frequency.

It is thus observed that the magnetic permeability exerts a multiplying effect on the effectiveness of a dissipative layer in a proportion of the order of $\sqrt{\mu}$, this ratio tending to rise at the higher frequencies, owing to additional losses by resonance or magnetic relaxation.

The different cases hereinabove described are discussed whilst ignoring displacement currents. This remains valid for as long as the product of dielectric constant x resistivity ($\epsilon\rho$) remains small compared to the periodicity of the HF fields. Beyond this, allowance must be made for the displacement currents, whose action may become predominant with respect to conduction currents at very high frequencies in good dielectric materials. As for the magnetic layers, the dielectric losses are introduced moreover as supplementary losses.

The case of the circular conductor has been dealt with throughout the theoretical and experimental research carried out starting with the differential equation ($E$) specified hereinabove, but it should be understood that the conductors may have other cross-sectional shapes. The invention is applicable for example to the flat conductors, more especially flat conductors employed in wave guides.

It can be demonstrated that, in all cases, the high frequency resistance of a conductor of a radius $r$ (FIG. 1) is conditional on the factor:

$$F=\frac{|\sigma_r|\cdot\rho_r}{|I_{tot.}|} \quad (F)$$

in which:
$\sigma_4$ is the current density at the surface of the conductor,
$\rho_r$ is the resistivity at the surface, $I_{tot}$ is the modulus of the total current in the conductor, or $$I_{tot.}=2\pi\int_0^r \sigma R\cdot dR$$

This simple formula may be considered as a guide for the arrangements according to the invention; the tendency will exist to maximize this factor to obtain high absorption. The sole observation of the incompatibility of a high value of the current density $**_r$ at the surface of the conductor with a high value of the resistivity $\rho_r$ at this surface, reveals the necessary existence of optimum values and laws for the parameters and their variations as a function of the diameter of the conductor and as a function of frequency. Certain aspects of these laws have already been delineated by the results of research work described above, and it is clear that these results not only lack any limiting effect, but on the contrary represent a fundamental basis opening the way for a multitude of new possibilities in the field of energy transmission elements for selective absorption at high frequencies, either in the case of absorption increased to surprising degree or in the case of reduced absorption in certain frequency ranges. It will be recalled from the preceding description, that a general feature of cables or other transmission elements according to the invention consists of applying on the surface of a conductive element, at least one dissipative layer exerting an influence on the radial distribution of the HF current density, compared to the distribution of giving rise to the conventional skin effect. As more clearly apparent from the curves of FIG. 8, a weak influence gives rise to a reduction in the resistance $R_{HF}$ by augmentation of the effective section for the passage of current in the subjacent conductive element, whereas a powerful influence may lead to considerable increases in $R_{HF}$ by localization of the current in the dissipative layer or layers.

FIGS. 13 and 14 show two possible embodiments in which there is a stratification of a layer of dissipative material established in a plurality of elementary layers separated by dielectric layers.

In the construction of FIG. 13, a series of dissipative layers 31 to 34 of decreasing thicknesses $e1$, $e2$, $e3$, $e4$ follow each other at constant intervals $d$ which may be filled by an optional dielectric material, formed by a thin layer of varnish for example. The elementary layers 31 to 34 themselves may for example each be formed by a layer of conductive paint which may contingently be magnetic, and the variations in thickness may be obtained by varying the number of layers applied in each case.

In the embodiment of FIG. 14, a series of dissipative layers 35 to 40 of identical thickness follow each other at distance $d1$ to $d5$ of increasing magnitude, for example formed by the application of an increasing number of layers of insulating varnish.

As long as the thickness of the elementary layers thus formed is smaller than the skin thickness, it is no longer the resistivity, but the local resistance which varies.

The thin dissipative layers, specifically the simply resistive layers, are very easily obtained in practice, for example, in the form of resistive paints, plastics changed with carbon, or textile braiding or the like impregnated with carbon. The layers thus formed may at the same time contribute to satisfactory mechanical stability or other practical requirements (for example, facility of separation of conductors in the case of a multicore cable).

Several examples of practical applications of the invention will now be described, which have been experimentally developed in the laboratory.

Figure 15:
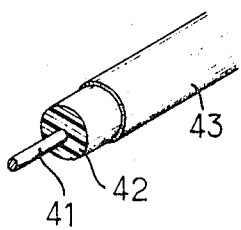

FIG. 15 shows a conductor comprising a copper wire 41 having a diameter of 1 mm., within an absorbent plastic sheath 42 containing a substantial charge of ferrite (ferrite 80 percent, PVC 20 percent), this plastic sheath itself being covered by a coating 43 forming a resistive external sheath, of a resistance of approximately $4000\Omega/m$, formed by a layer of conductive paint.

Figure 16:
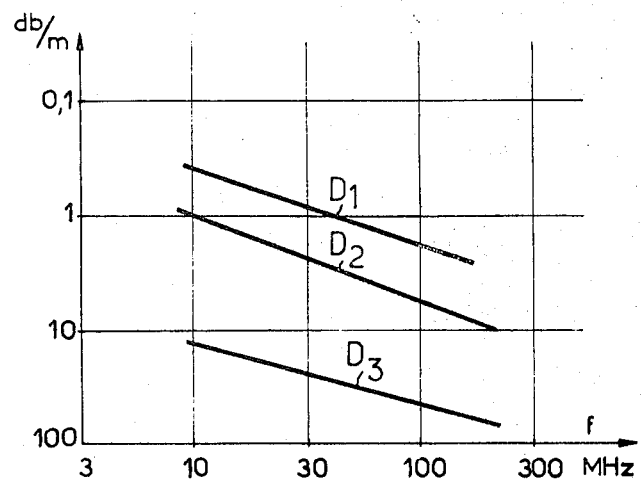

The attenuations expressed in $db/m$ as a function of frequency are shown in FIG. 16, the curves being as follows:

D1: for copper wire 41 alone, in the bare state
D2: for the wire 41 and the sheath 42,
D3: for the composite wire 41 + sheath 42 + coating 43.

These curves show the surprising attenuating effect which is obtained. At 10 Mc/s, the cable has an impedance 40 times greater than that measured for low frequency current. At 100 Mc/s, this impedance is 2,000 times greater.

Figure 17:
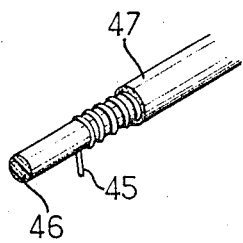

FIG. 17 shows an application of a kind in which the conductor may have a certain ohmic resistance (being the case of ignition wires for explosion engines for example), the conductor 45 is wound in a helix on a core or center 46 and covered with a resistive external sheath 47. In the example in question, the wire 45 is made of high permeability magnetic alloy with a pitch of 30 turns per centimeter. The direct current resistance is approximately $1,500\Omega/m$. The core 46 contains 80 percent of ferrite and 20 percent of PVC and has a diameter of 2.1 mm.

The speed of propagation along the wire is decelerated in these conditions owing to the high permeability of the wire itself, owing to the winding causing a decrease in speed in the ratio $1/\sin \Phi$, $\Phi$ being the angle of pitch of the windings and owing to the presence of the core 46 which has high permeability and permittivity. On the other hand, the sole faster propagation layer 47 is present.

Experience shows that in the case of a layer such as 47 situated on a coiled conductor, the maximum absorption at a given frequency is reached for a thickness several times smaller than the skin thickness. This reduction seems to be attributable to the deceleration of the wave along the helix.

Figure 18:
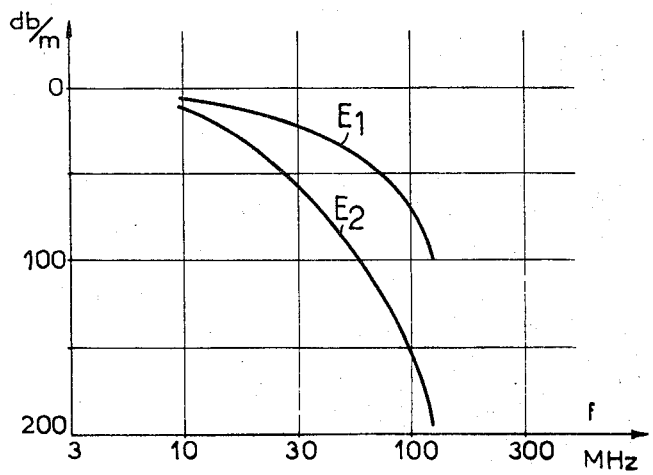

Attenuations measured over 1 meter of a cable of this kind are shown in FIG. 18, the curves E1 and E2 respectively showing the results obtained in the absence and in the presence of the external sheath 47.

As well as the applications to ignition cables, an element is available for choice in forming filters.

Figure 19:
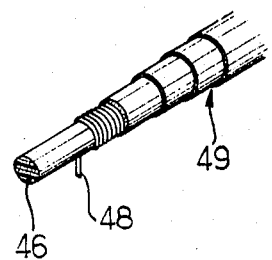

FIG. 19 illustrates a cable similar to that of FIG. 17, but with a copper conductor 48 carrying a resistive external sheath 49 comprising several semiconductive layers. Different specimens were made of a cable of this kind, with resistive sheathing formed of different numbers of applied successive layers. The copper wire 48 had a diameter of 0.12 mm. and was wound in 15 turns per centimeter.

Figure 20:
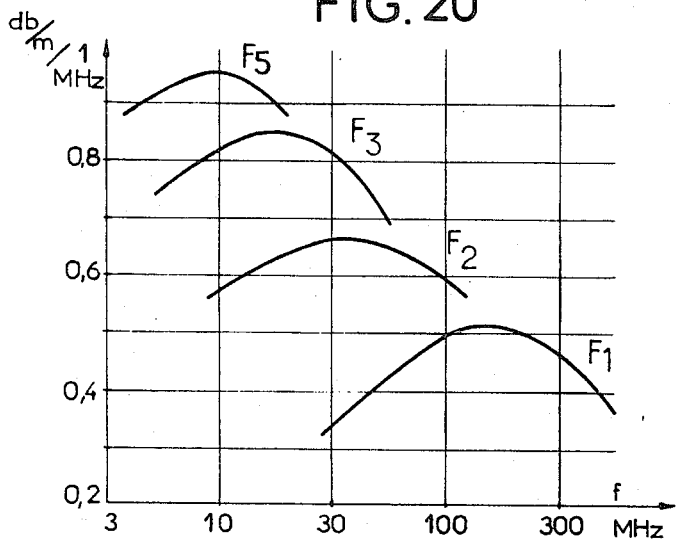

FIG. 20 shows the degrees of attenuation obtained with specimens comprising, respectively, one F1, two F2, three F3 and five F5 layers of paint, the value plotted as the ordinate being the attenuation per meter divided by the frequency.

This experiment demonstrates the influence of the variation of the parameters of a dissipative layer. The frequency at which maximum losses occur is proportional to resistivity if one considers a layer of constant thickness, is inversely proportional to the square of the thickness of the layer, and is inversely proportional to its permeability. FIG. 20 clearly shows the diminution (from F1 to F5) of the frequency at optimum absorption, and at the same time, the value of the overall attenuation (multiply the scale with the frequency) diminishes since skin thickness increases at low frequencies, so that the conditions of maximum attenuation no longer obtain.

Since the fact of arranging the conductor in a helix amounts to slowing the axial wave, its effect is equivalent to that obtained by increasing the conductivity; one may equally cause the multiplying of the permeability and of the permittivity, all intermediary combinations being possible. A combination of this kind may for example comprise resistive helixes superimposed one on another, insulated from each other, of the same thickness, but of rising pitch. Here again, the techniques of pure resistance are easily applicable in practice for example in the form of semiconductive strips of paint, of charged plastic, or of impregnated textile yarn.

One is thus led to a sphere of applications of the invention which is of special importance, namely that of industrial cables and specifically of overhead lines.

FIG. 21 shows a conductor of this kind, which on the actual conductor 51, being a multifilament copper conductor in this case, comprises a helical winding 52 of high permeability magnetic wire wound with a pitch of 30 turns per centimeter and covered by an external layer 53 of resistive paint.

The graph of FIG. 22 shows, at G1 an attenuation curve obtained with the copper conductor alone, at G2 with this conductor covered by the magnetic helix only, and at G3 with the conductor as illustrated in FIG. 21: the considerable influence of the simple external resistive paint layer being noteworthy.

Such an entirely metallic cable is well suited for producing high tension cables, for example overhead power lines. The attenuation obtained at high frequencies amounts to disrupting the rigid front of violent pulses on the line for example due to lightning or arcing across. A cable of this kind thus provides a simultaneous solution for the problem of protection of terminal installations, and that of suppressing industrial interference which are so troublesome owing to the substantial lengths of these lines which radiate very easily at high frequency.

In the case in which one wishes to establish preferential absorption effects in certain frequency ranges, one may very easily obtain "quasi-resonant" effects by cutting cylinders of a length corresponding to half the wavelength in a layer of constant speed of propagation, such as the sheathing 53, as shown by FIG. 23, in the case of a cable described with reference to FIG. 21. Resonant circuits of slight over voltage are thus formed, which absorb the frequencies close to resonant frequency in particular.

As a variant of the cable described with reference to FIG. 21, in order to decelerate the propagation the winding 52 may be replaced by the arrangement of a thin magnetic insulating layer of high permeability and high permittivity. Even with a thickness distinctly smaller than the skin thickness, within a given frequency range, that is to say without intervening as a dissipative layer, a layer of this kind can act as an effective device multiplying the absorption effects of one or more associated dissipative layers.

In an even simpler embodiment, one may envisage the arrangement of a dissipative layer on the actual surface of the conductor itself, then being content with the decelerating effect resulting only from the conductivity of the conductor itself. One is thus brought to envisage a group of wholly metallic embodiments having a more modest absorptive performance, but of a robustness proof against any strains. A dissipative layer may thus be formed on the surface of a conductor by galvanoplastic methods allowing of deposition of a dissipative layer for accelerated propagation, of resistive alloy such as nichrome for example. Another technique may reside in causing the formation on the surface of the conductor, of aluminum for example a layer of doped oxides, to produce an appropriate conductivity. This represents a practical embodiment of conductivity diagrams having one or more stages of the kind indicated hereinabove at C4 in FIG. 3.

Although the linear attenuation obtained is more modest in this case, in the absence of a special deceleration of the speed of propagation in the conductor, the overall results obtained may be of extreme interest and importance in view of the considerable lengths applicable in the case of overhead power transmission lines in particular.

FIG. 24 shows a typical application of the invention to a two-wire cable carrying a powerful industrial current. As a decelerating device, the copper conductors 61 carry a helix 62 of high permeability magnetic wire and are surrounded by an absorbent magnetic layer 64. A strip or braid 66 of resistive material has been arranged above; being a layer of plastic charged with carbon or a semiconductive textile braid, which in addition to the attenuating effect, facilitates mechanical suppression of the conductors for use. The whole is immersed in a coating of PVC possessing relatively high permittivity, and dielectric losses.

The cable thus formed is particularly appropriate for interference suppression of all domestic and industrial equipment generating radio interference.

The application of the invention to coaxial cables is evident, and starting from the surface of each of the two conductors towards the surface of the other a succession of the layers of deceleration and of dissipation is arranged.

The different cables described hereinabove behave practically like pure resistances (nonreactive) variable with frequency. From sections of such cables, one may produce low-pass filters of the resistance-capacity type, in combination either with localized capacities, or with distributed capacities. FIG. 25 shows a form of embodiment of a filter of this last type, that is to say a low-pass RC filter of the distributed constant type, FIG. 26 being an equivalent diagram.

In the cable section 70 illustrated in FIG. 25, the conductive wire 71 is wound, with interposition of a dielectric layer formed by a sheet 72 of "MYLAR" for example, on a condenser armature 73 formed by a plurality of metal strips distributed on a core 74 of absorbent magnetic mixture. The strips forming the armature 73 are connected to earth as shown at 75, at one of the extremities of the section of least. The conductive winding 71 is enclosed in a second dielectric sheet 76 which in its turn carries an absorbent resistive layer 77 and an insulating layer 78, possibly of the loss type.

Because of its division into parts insulated from each other beyond their terminal earthing region, an armature of this kind leaves in being the decelerating action exerted on the current wave traversing the conductor 71 by the magnetic core 74. An equivalent structure could be embodied in the form of insulated metal wire braiding (copper for example).

Like all the preceding embodiments, this embodiment can form the object of various other variants moreover, in respect of the arrangement of the decelerated propagation region, and of the accelerated propagation dissipative region or regions, as well as in respect of the form of embodiment of the capacitive armature. An armature of this kind may also be formed, for example by winding a second earthed wire in parallel with the conductive wire.

The number, nature and dimensions of the different regions or layers will possibly be chosen as a function of the performance required in each case. If, in order to secure progressive increase in wavelength, it may be considered desirable to have a progressive variation of the electrical parameters (conductivity, permeability, permittivity, and losses), it has become apparent that this may be accomplished in practice by placing different materials on each other in greater or lesser numbers, with or without division of this structure by intermediate insulating layers allowing faster propagation. In respect of the insulating layers more specifically, it is known that the skin thickness is infinite in a perfect insulator. In reality however, the dielectric losses change this situation and appropriate metering of losses within the scope of the invention offers very wide possibilities of action on the behavior of conductors in certain higher or lower frequency ranges. In other words, by exploiting the variations of the different parameters as a function of the frequency, heterogeneous conductors are produced which no longer display the conventional skin effect, on the contrary tending towards an equidistribution of the current density in certain ranges.

I claim:

1. An element for the transmission of electrical energy in a selected high frequency range, of the kind comprising at least one conductive element of heterogeneous structure in the radial direction and composed of a metallic core and a plurality of surrounding layers, said core and said layers being in direct conductive contact with one another along their entire surface, wherein the materials forming the conductive element are so distributed in the radial direction that at least one of the parameters resistivity, permeability and permittivity of said materials thereby selected increases progressively in a radial direction from one material to the next thereby to impose on the resistance of the conductor a predetermined variation within a given range of frequencies by a modification of the radial distribution of the current density as compared with the distribution of the conventional skin effect in a sense tending to reduce the current density at the surface to the advantage of the current passing inside the conductor, the total thickness of all of the layers provided being at least substantially equal to the conventional skin effect thickness thereof at a frequency at least equal to the cutoff frequency of said element.

2. A transmission element according to claim 1, wherein the radial distribution of the materials forming the conductive element is so selected that there is a relatively superficial modification of the current distribution thereby reducing the resistance of the conductive element at a certain frequency.

3. A transmission element according to claim 1, wherein the radial distribution of the materials forming the conductive element is so selected that the modification of current distribution is limited in depth from the surface of the conductive element thereby reducing the attenuation engendered by the conductive element.

4. A transmission element according to claim 1, wherein the radial distribution of the materials forming the conductive element is selected so that the relative depth of the modification of the current distribution in the element is such as to increase the resistance of the element over a range of frequencies.

5. A transmission element according to claim 1, wherein the attenuation of the conductive element over a range of frequencies is increased by relatively deep modification of the distribution of materials of the element.

6. A transmission element according to claim 2, which has a reduced resistance at a given frequency, further comprising a resistive surface layer, the thickness of this resistive layer being limited to a predetermined fraction of the skin thickness of the material of the layer at said given frequency.

7. A transmission element according to claim 4, having a high resistance in a high frequency range, characterized by a progressive variation from the center towards the periphery of at least one of the parameters resistivity, permeability and permittivity, tending to create a substantially uniform radial distribution of the current density in at least one layer of the conductor.

8. A transmission element according to claim 4, having a decreasing variation in the resistivity of the conductor from the center towards the periphery, thereby giving a substantially constant resistance within a wide frequency range.

9. An absorbent transmission element according to claim 4, characterized by the successive arrangement from the inside to the outside of a decelerated propagation conductive core for the current wave and of at least one dissipative layer for accelerated propagation of said wave.

10. An absorbent transmission element according to claim 4, comprising a conductive metal element having progressive variation of resistivity from the center to the periphery.

11. An absorbent transmission element according to claim 4, comprising a conductive metal element having progressive variation of permeability from the center to the periphery.

12. An absorbent transmission element according to claim 4 wherein said layers comprise, around said metallic core, a succession of layers presenting a progressive increase towards the periphery of at least one of the parameters resistivity, permeability and permittivity.

13. An absorbent transmission element according to claim 9, wherein the decelerated propagation conductive core comprises a straight conductor of magnetic wire.

14. An absorbent transmission element according to claim 9, wherein the decelerated propagation conductive core comprises a conductor with a magnetic covering.

15. A transmission element according to claim 14, wherein the core comprises a straight nonmagnetic conductor covered by a layer of magnetic metal.

16. A transmission element according to claim 14, wherein the core comprises a straight nonmagnetic conductor covered by a winding of magnetic wire.

17. A transmission element according to claim 9, wherein the conductor is wound in a helix.

18. A transmission element according to claim 9, comprising an overhead power transmission line conductor on the surface of which there is arranged a succession of metallic layers of conductivities decreasing from the inside to the outside.

19. A transmission element according to claim 4, comprising a section of limited length of conductive elements forming a low-pass filter.

20. A transmission element according to claim 19, in combination with at least one localized capacitor.